Sept. 5, 1944.   E. W. FULLER   2,357,321
CONTROL
Filed May 16, 1941
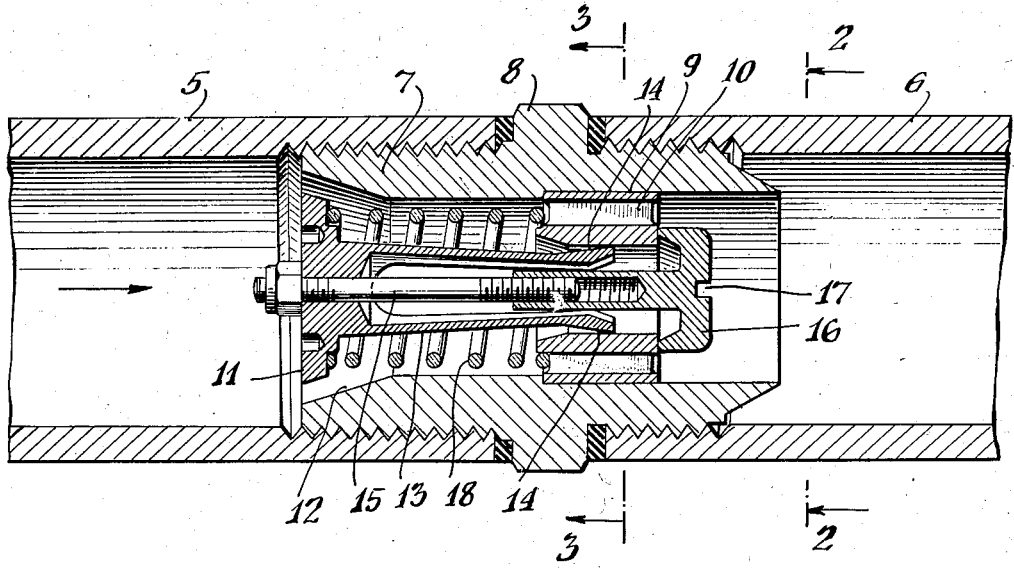
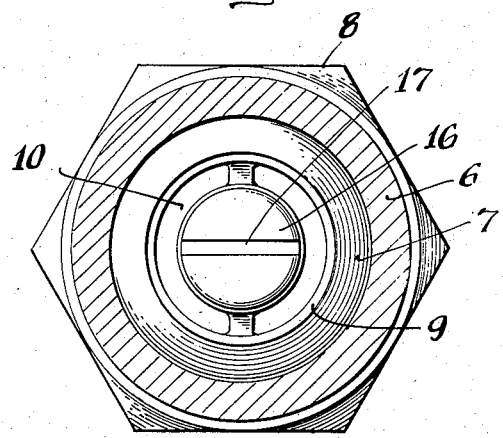 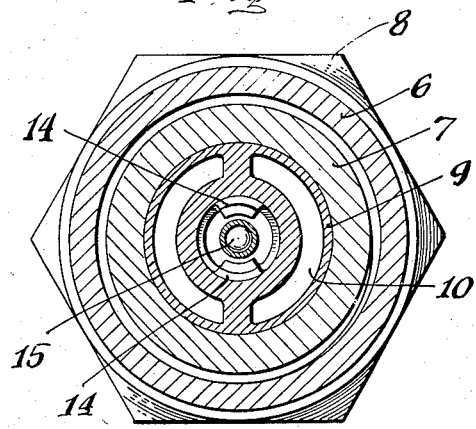
INVENTOR.
Ernest W. Fuller
BY
ATTORNEYS Patented Sept. 5, 1944

2,357,321

UNITED STATES PATENT OFFICE 2,357,321

CONTROL

Ernest W. Fuller, Shaker Heights, Ohio, assignor to The Acrotorque Company, Cleveland, Ohio, a corporation of Connecticut Application May 16, 1941, Serial No. 393,772

3 Claims. (Cl. 137—153)

This invention relates to a structurally and functionally improved control and in its more specific aspects aims to provide a unit of this character which will function as a valve to control the flow of fluids.

In fluid distributing systems and especially where liquids are involved, as in the case of hydraulic systems, it is well appreciated that there always exists the danger of a line rupturing. This is especially true in hydraulic transmissions where a source of liquid under pressure serves to create a flow of such liquid to a motor mechanism. When the line or passage extending from the source to the motor is broken, there will be an immediate and increased flow of liquid and which, if not detected will cause the system to be rapidly drained.

In order to overcome this difficulty, the present invention aims to provide a control which may be associated with a fluid line or pipe, and which control will normally be inoperative and will moreover in no wise interfere with the proper flow of the fluid through the line. However, in the event of the flow suddenly increasing—as would be the case if a rupture or breakage occurred in the line—then the control will automatically function to interrupt further flow through the passage.

Accordingly, it is a further object of the invention to furnish a control which will function automatically in the event of an improper flow of fluid occurring and so that, the system will not be drained of such fluid. Also, the control will automatically cause a cessation of operation on the part of the motor or other mechanism which is coupled to the line. This will give immediate notice to the operator that a condition exists which needs correction.

Another object is that of designing a control which may readily be applied to a hydraulic system and without any disturbance to the normal operation of the latter, and without requiring any reconstruction of the mechanism which forms a part of the system.

Still another object is that of furnishing a unit of this character and which, when once operated, will preferably require a deliberate and manual manipulation in order to re-establish the initial and proper condition of the parts.

Another object is that of furnishing a control which will embody relatively few parts, each individually simple and rugged in construction, these parts remaining operative throughout the life of the assembly and being susceptible to manufacture out of light weight materials, so that it may readily be applied to aircraft or in other installations where the weight factor is a consideration.

With these and other objects in mind, reference is had to the attached sheet of drawings illustrating one practical embodiment of the invention and in which:

Fig. 1 is a sectional side view of a hydraulic line with the control associated therewith;

Fig. 2 is a transverse sectional view taken along the lines 2—2 and in the direction of the arrows as indicated in Fig. 1; and Fig. 3 is a similar view taken along the lines 3—3 and in the direction of the arrows as also indicated in Fig. 1.

In these views, the reference numerals 5 and 6 indicate tube sections which form a part of a fluid or hydraulic system and through which the fluid may move in the direction of the arrow as indicated in Fig. 1. Normally, these sections would be connected to each other by a coupling of any desired type. To mount such a coupling, the bores of the tube may be threaded as indicated. The present invention contemplates that the control will take the place of the coupling or sleeve member which would ordinarily be employed at this point and so that no additional part will be necessary.

Referring to the detailed structure of the control as illustrated in these views, it will be observed that it preferably includes a sleeve 7 which is threaded to engage the threads of tubes 5 and 6 in order to maintain the tubes connected to each other. This sleeve may be enlarged as indicated at 8 to provide a nut portion to permit of the ready manipulation of the control and its application to the tube sections. Also as shown, packing of any suitable type may be interposed between the parts to guard against leakage. The bore of sleeve 7 mounts a collar 9 which is formed with arcuate or other openings 10 defining the central portion of the collar. The area of these openings is such that no substantial impediment to the flow of fluid through the tubes will be present. This will be achieved by having the area of openings 10 properly proportioned with respect to the normal flow which is contemplated through these tubes.

Slidably mounted in the bore of the central portion of the collar 9 is the stem of a valve 11. This valve normally lies adjacent the forward end of sleeve 7. At that point, the sleeve is formed with a tapered bore 12 which provides a seat for the valve 11. The stem is preferably in the form of a pair of resilient arms 13, the inner ends of which are flared outwardly as indicated at 14 to provide bearing contact with the bore of the central portion of the collar. A bolt 15 may extend through the valve and have its body enclosed within the space defined by the arms 13. The inner threaded end of the bolt 15 is received in the correspondingly threaded socket of a retaining cap or member 16, which bears against the rear face of the collar member 9. The retaining member 16 may conveniently be formed with a transverse slot 17 to receive the bit of a screw driver and by means of which, the retaining member may be rotated. Such rotation will of course, serve to project and retract the bolt 15 with reference to that member and thus allow of adjustment of the parts. It is, of course, understood that said adjustment is made prior to connection of tubes 5 and 6 together.

A spring 18 is interposed between the collar 9 and the inner face of the valve 11. Consequently the latter is maintained in the position illustrated in Fig. 1. Also, the thrust exerted upon the stem of the valve causes the latter to tend to move to the left as viewed in Fig. 1 to thus draw the retaining member 16 into intimate contact with the collar. Consequently, all parts will normally be maintained in the positions illustrated. Also, it is to be emphasized that in such positions, the unobstructed passage or space which remains is adequate to permit of a proper flow of fluid through the tubes 5 and 6 and without the development of appreciable back pressure or slowing down of any motor mechanism connected to such tubes.

Now assuming that the line is ruptured by a break in tube 6 or any subsequent part of the mechanism defining the fluid passage beyond the same, it will be appreciated that the pressure within the line will drop. Thereupon, the velocity of flow through the sleeve 7 will instantly increase. The parts are so proportioned that this increase in velocity will act on the valve 11 so that the latter will function as a piston and move to the right or in other words, towards the collar 9. In such movement, the spring 18 will be compressed. This spring may be of the "constant resistance" type. However, even if it is not, it will be obvious that the parts will still function as desired. This will be especially true because as the valve 11 moves further into the bore of sleeve 7, the effective area between the edge of the valve and this bore will be decreased. This will result in an increased velocity of flow past the edges of the valve, which will in turn urge the latter at an accelerated pace into the bore of the sleeve. Such movement will continue until the edge of the valve engages the seating surface 12, at which point no further flow of fluid may occur.

In order to assure that the parts will now be retained in this position, it will be seen that with the valve 11 moving inwardly of the bore of sleeve 7, the end portions 14 of the arms 13 will have shifted to positions beyond the central or hub part of the collar 9. As soon as this occurs and due to the outwardly flared configuration of the end portions 14, they will cam against the edge of the hub and serve to draw the entire assembly to the right as viewed in Fig. 1. Also, they will function as a lock or latch structure to assure that the valve 11 will not accidentally move to unseated position. This will, of course, be true because of the relative stiffness of the spring arm 13 which will resist movement of the spring 18.

It will be understood that with a structure of this nature, a control unit is furnished which may readily be applied to fluid lines and without requiring any reconstruction of these lines or the mechanism associated therewith. The control will normally remain inoperative. However, should a rupture of a line occur, the control will immediately function to interrupt further flow of fluid through the line. Consequently, the fluid will not be "bled" from the system and the advantages of this result are obvious.

With the valve in passage-sealing position, it will remain in that position until it is manually adjusted to again assume its initial position. This will be especially valuable because with the stoppage of flow, the operator will be put on notice that a line has ruptured. Naturally, the operator will at the earliest moment either disconnect the source of pressure from the line which has been effected, or else will interrupt the further operation of the compressor or other mechanism which provides the source of pressure. Thereupon if no restraining influence were exerted upon the valve, it would automatically move to open position and this might still permit of a relatively large quantity of fluid flowing out through the ruptured part. This danger will not exist with the present structure, in that, even with a subsequent pressure drop in line 5, the valve will remain seated. Thereafter, the operator may of course open the coupling and manually adjust the parts so that the valve will again be in open position.

From the foregoing it will be appreciated that among others, the objects of the invention as specifically aforenoted are achieved. Obviously, numerous changes in construction and rearrangements of the parts might be resorted to without departing from the spirit of the invention as defined by the claims.

I claim:

1. A control including a sleeve formed with a bore and a valve seat, a valve cooperable with said seat, a stem forming a part of said valve and extending into said bore, and a collar slidably mounting said stem, said stem comprising a pair of resilient arms adapted for movement into stem-expanding position when projected beyond said collar.

2. A control to be interposed in a line through which fluid is to flow past said control normally at a speed below a predetermined velocity and under which conditions said control remains inoperative, said control functioning to interrupt and maintain interrupted further flow through said line upon the flow therethrough accelerating beyond such predetermined velocity, said control including a valve extending in the direction of fluid flow, a seat to the rear of and normally spaced from said valve and between which seat and valve the fluid flow normally occurs, said valve under flow of increased velocity moving into sealing contact with said seat, a stem for said valve and including a plurality of radially movable arms, and a member enclosing said arms for slidably guiding the movements of the latter as said valve moves towards its seat, said arms moving radially of said member as said valve seats to lock said valve in seated position and maintain it against further movement from such position.

3. A control to be interposed in a line through which fluid is to flow past said control normally at a speed below a predetermined velocity and under which conditions said control remains inoperative, said control functioning to interrupt and maintain interrupted further flow through said line upon the flow therethrough accelerating beyond such predetermined velocity, said control including a valve extending in the direction of fluid flow, a sleeve encircling said valve and to be disposed in the fluid line, a seat forming a part of said sleeve and disposed to the rear of and normally spaced from said valve and between which seat and valve an unobstructed fluid flow normally occurs, said valve under flow of increased velocity moving into sealing contact with said seat, a valve stem extending rearwardly of said valve, a collar within said sleeve and slidably mounting said stem, and means carried by said stem and bearing against said collar for adjustably drawing said valve towards said seat.

ERNEST W. FULLER.